(12) United States Patent
Sanguinetti et al.

(10) Patent No.: US 11,356,579 B2
(45) Date of Patent: Jun. 7, 2022

(54) METHOD AND DEVICE FOR STEGANOGRAPHIC PROCESSING AND COMPRESSION OF IMAGE DATA

(71) Applicant: Dotphoton AG, Zug (CH)

(72) Inventors: Bruno Sanguinetti, Zug (CH); Christoph Clausen, Gramatneusiedl (AT)

(73) Assignee: DOTPHOTON AG, Zug (CH)

( * ) Notice: Subject to any disclaimer, the term of this patent is extended or adjusted under 35 U.S.C. 154(b) by 76 days.

(21) Appl. No.: 17/090,577

(22) Filed: Nov. 5, 2020

(65) Prior Publication Data

US 2021/0144274 A1    May 13, 2021

(30) Foreign Application Priority Data

Nov. 7, 2019 (EP) .................................... 19207833

(51) Int. Cl.
| | |
|---|---|
| *G06K 9/00* | (2022.01) |
| *H04N 1/44* | (2006.01) |
| *H04N 1/32* | (2006.01) |
| *H04N 1/41* | (2006.01) |

(52) U.S. Cl.
CPC ....... *H04N 1/4486* (2013.01); *H04N 1/32272* (2013.01); *H04N 1/41* (2013.01)

(58) Field of Classification Search
CPC ..... H04N 1/4486; H04N 1/32272; H04N 1/41
USPC ...................................................... 382/144
See application file for complete search history.

(56) References Cited

U.S. PATENT DOCUMENTS

| | | | |
|---|---|---|---|
| 6,031,939 | A | 2/2000 | Gilbert et al. |
| 6,044,156 | A | 3/2000 | Honsinger et al. |
| 7,050,639 | B1 | 5/2006 | Barnes et al. |
| 2002/0180997 | A1 | 12/2002 | Rozzi |
| 2004/0223626 | A1 | 11/2004 | Honsinger et al. |

(Continued)

FOREIGN PATENT DOCUMENTS

| | | |
|---|---|---|
| EP | 0791 273 A1 | 8/1997 |
| EP | 2 808 841 A1 | 12/2014 |
| EP | 3 185 555 A1 | 6/2017 |

OTHER PUBLICATIONS

Dabov, Kostadin, et al., "Image Denoising by Sparse 3-D Transform-Domain Collaborative Filtering," *IEEE Transactions on Image Processing*, vol. 16, No. 8, pp. 2080-2095 (Aug. 2007).

(Continued)

*Primary Examiner* — Gabriel I Garcia
(74) *Attorney, Agent, or Firm* — Christensen, Fonder, Dardi & Herbert PLLC

(57) ABSTRACT

A method for steganographic processing and compression of image data with negligible information loss, wherein said image data comprises noise and information. The method includes the steps of: acquiring image data to be processed and/or compressed, storing and/or transmitting the image data, and preparing the acquired image data for compression. The preparation step includes determining an input noise model and corresponding parameters adapted to reflect noise created by an image sensor used to capture said image data, and removing, with negligible information loss, noise from the acquired image data by use of the input noise model such as to produce noise-reduced image data.

18 Claims, 4 Drawing Sheets

(56) References Cited

U.S. PATENT DOCUMENTS

2006/0023793 A1* 2/2006 Kagechi ............... H04N 19/98
375/E7.137
2006/0262846 A1* 11/2006 Burazerovic .......... H04N 19/29
375/E7.079
2015/0303953 A1* 10/2015 Levitt ................. H04B 1/0475
455/114.2

OTHER PUBLICATIONS

Luisier, Florian, et al., "Image Denoising in Mixed Poisson-Gaussian Noise," *IEEE Transactions on Image Processing*, vol. 20, No. 3, pp. 696-708 (Mar. 2011).

Murtagh, F., et al., "Image restoration with noise suppression using a multiresolution support," *Astron. Astrophvs. Suppl. Ser.*, vol. 112, pp. 179-189 (1995).

Pence, W. D., et al., "Lossless Astronomical Image Compression and the Effects of Noise," *Publications of the Astronomical Society of the Pacific*, vol. 212, pp. 414-427 (Apr. 2009).

Pence, W. D., et al., "Optimal Compression of Floating-Point Astronomical Images Without Significant Loss of Information," *Publications of the Astronomical Society of the Pacific*, vol. 122, pp. 1065-1076 (Sep. 2010).

\* cited by examiner

METHOD AND DEVICE FOR STEGANOGRAPHIC PROCESSING AND COMPRESSION OF IMAGE DATA

RELATED APPLICATION

The present application claims priority to European Patent Application No. 19 207 833.5, filed Nov. 7, 2019, the disclosure of which is hereby incorporated by reference herein in its entirety.

FIELD OF THE INVENTION

The present invention pertains to a method as well as to a corresponding device for steganographic processing and compression of image data with negligible information loss, wherein said image data comprises noise and information. The method comprises the steps of acquiring image data and preparing the acquired image data, wherein said preparation step comprises the steps of determining an input noise model and corresponding parameters adapted to reflect noise created by a source image sensor used to capture said image data, removing, with negligible information loss, noise from the acquired image data such as to produce noise-reduced image data, the method further comprising a step for storing and/or transmitting the image data.

BACKGROUND OF THE INVENTION AND STATE OF THE ART

The number of digital images and videos produced every year has been growing at an accelerating pace. For decades, compression has played an essential role in enabling the efficient storage and distribution of these images. Typically, this technology has been split in two fields: lossless compression maintains a full, bit-by-bit identical copy of the original, at the expense of a low compression ratio (typically 2:1), whereas lossy image compression produces an image that is visually similar to the original, but is not identical, at a high compression ratio (typically of the order of 10:1). Lossy compression, however, may generate "artefacts", i.e. image features that were not part of the original (e.g. block artefacts, posterization ringing, aliasing, blurring, . . . ), and introduce biases. Modern algorithms, such as JPEG2000 or H265 amongst others, attempt to make these artefacts barely visible to the human eye and may be denoted as "visually lossless". However, such algorithms have been primarily engineered for distributing data to end-users, and post-processing images compressed with such algorithms may reveal artefacts which were previously invisible to the human eye, as is observed for example when "lifting the shadows" of a JPEG image. Furthermore, re-compressing an image already compressed by such algorithms may result in interactions between the two algorithms and the creation of visible artefacts.

In professional and technical applications, where the images are considered valuable data, users have been wary of using lossy compression, as it may result in unforeseen consequences or introduces bias in the data making it metrologically inaccurate. With the increased use of machine-learning approaches, ensuring that the compression losses are not visible by the human visual system has become less relevant, and image quality has become more critical. Particularly in critical applications, such as medical diagnostics, autonomous vehicles or infrastructure monitoring, retaining image quality in an objective manner is of utmost importance.

To satisfy this need, in previous work, the applicant has developed a compression technique where the information losses can be bounded in terms of information content, which is an objective measure unrelated to the human visual system, such as disclosed in the European patent application EP 3 185 555. The technique presented therein achieved a compression ratio in the range 5:1 to 10:1 whilst simultaneously giving some strict guarantees on the absence of artefacts, from a metrological standpoint. Although that compression technique has proven satisfactory in many situations, some inconveniences were identified during extended use. In particular, some particular analytical techniques yielded results which were different in a statistically significant way from the results obtained by analyzing the uncompressed data. Also, with this compression technique, it is not possible in advance to infer which analysis the compressed data are suitable for, and for which they are not. It is possible for example for compressed data to be suitable for all current analysis techniques, but to fall short in the future once techniques become more advanced. For users, this means that with the existing compression techniques there are situations where there is no clear, simple guideline of the drawbacks brought by compression, and the suitability for applying it to a specific dataset.

SUMMARY OF THE INVENTION

It is an object of the present invention to overcome the above mentioned difficulties and to provide lossless or at least partially lossless image compression allowing to give strong guarantees to the user that the processed, and optionally compressed and decompressed, image data gives reliable results, i.e. statistically equivalent to those obtained with raw uncompressed sensor data, when processed or analyzed by any algorithm, current or future, whilst simultaneously allowing for comparatively high compression rates of typically up to about 10:1.

It is also an object of the present invention to ensure that an image that has been processed, and possibly compressed and decompressed can only with difficulty be distinguished, without fulfilling certain conditions, from an unprocessed raw image arising from a particular, real or ideal sensor model.

It is another object of the present invention to allow embedding of several types of useful information into the processed image, while guaranteeing that the processed image may still be used in any processing application where the raw image may be used, and give statistically indistinguishable or close to indistinguishable results.

It is a further object of the present invention to allow users to fully benefit from this novel compression technology by allowing them to use this technology without significant alterations to their workflow, or of their existing systems, for example by allowing them to continue using the "container" files of their choice, such as tiff, dng, png, dicom, jp2, etc.

To this effect, the present invention proposes a method for steganographic processing and compression of image data with negligible information loss which is characterized by the features enumerated in claim 1 and which allows to achieve the objectives identified above. In particular, the method according to the present invention distinguishes itself by the fact that the step of preparing the acquired image data further comprises the steps of determining a target noise model and corresponding parameters adapted to reflect noise created by a real or ideal target image sensor, generating pseudo-noise according to said target noise model, adding the generated pseudo-noise in steganographic manner to said noise-reduced image data such as to produce pseudo-noisy image data which is statistically equivalent as compared to image data acquired with said target image sensor, and by the fact that the step of storing and/or transmitting comprises storing and/or transmitting said pseudo-noisy image data, such as to allow for reproduction and/or subtraction of the pseudo-noise based on said pseudo-noisy image data and the parameters of the target noise model.

According to different embodiments of a method according to the present invention, said target noise model and its parameters are either constant as well as generally available, e.g. on an internet site or a specific documentation used in a given application of the method or by other means, and/or are stored and/or transmitted together with the pseudo-noisy image data.

In a preferred embodiment of a method according to the present invention, the step of preparing the acquired image data further comprises providing at least one steganographic key and storing and/or transmitting, by use of said steganographic key, the parameters of said target noise model used for generating the pseudo-noise to produce said pseudo-noisy image data. Preferably, these parameters are embedded into said pseudo-noisy image data. In an even more preferred embodiment, said steganographic key consists in at least a seed for a pseudo-random number generator.

In other preferred embodiments of a method according to the present invention, the step of embedding the parameters of said noise model used for generating the pseudo-noise into said pseudo-noisy image data comprises encrypting said parameters.

In some embodiments of a method according to the present invention, the pseudo-noise is generated with the help of a pseudo-random number generator and associated seed value(s). For those embodiments, said seed value(s) may serve as one of the steganographic keys.

In preferred embodiments of a method according to the present invention, said noise model adapted to reflect noise created by said source image sensor used to capture said image data and/or to emulate the noise of a desired target image sensor may be realized by a Poisson-Gaussian model or by a simplified model.

In embodiments of a method according to the present invention, removing noise from the acquired image data may be realized by quantization or denoising techniques.

In even more preferred embodiments of a method according to the present invention, the preparation step also comprises the step of embedding other data, like metadata of the image, calibration data of the sensor, and/or data useful for compression and/or for enhancing the security, safety and validation of the image data, into said pseudo-noisy image data. The pseudo-noisy image data comprising the parameters of said noise model as well as optionally said other data may be stored and/or transmitted as-is or embedded in a container file of any known file format, for example a container file of format tiff, jp2, dng or png.

In a further preferred embodiment of a method according to the present invention, the method further comprises the step of compressing said pseudo-noisy image data produced by the preparation step and optionally comprising the parameters of said target noise model, either as-is or as part of a container file.

The present invention further proposes a method for decompression of image data without information loss of image data compressed by use of the above method.

The present invention further concerns devices equipped with computer program means stored in a computer readable medium adapted to implement these methods, in particular a microprocessor, a field-programmable gate array, an image sensor, a microscope, a satellite, a mobile phone, a tablet, and/or a personal computer adapted to implement these methods.

Other features and advantages of the present invention are mentioned in the dependent claims as well as in the description disclosing in the following, with reference to the figures, the invention in more detail.

BRIEF DESCRIPTION OF THE DRAWINGS

The attached figures exemplarily and schematically illustrate the principles as well as several embodiments of the present invention.

DETAILED DESCRIPTION OF THE INVENTION

In the following, the invention shall be described in detail with reference to the figures mentioned above.

In general, the present invention uses techniques derived from cryptography and steganography to ensure that an image that has been compressed and decompressed cannot be distinguished, respectively can only with difficulty be distinguished, from an original "raw" image arising from a particular (real or ideal) sensor model unless the user has a specific cryptographic key (herein also termed steganographic key). In this case, any post-processing algorithm that has no access to the key must yield, in a statistical sense, the same result as it would have done on raw sensor data. In the following, the terms "image", "video" and "data" are used synonymously, except when explicitly specified otherwise.

Figure 1:
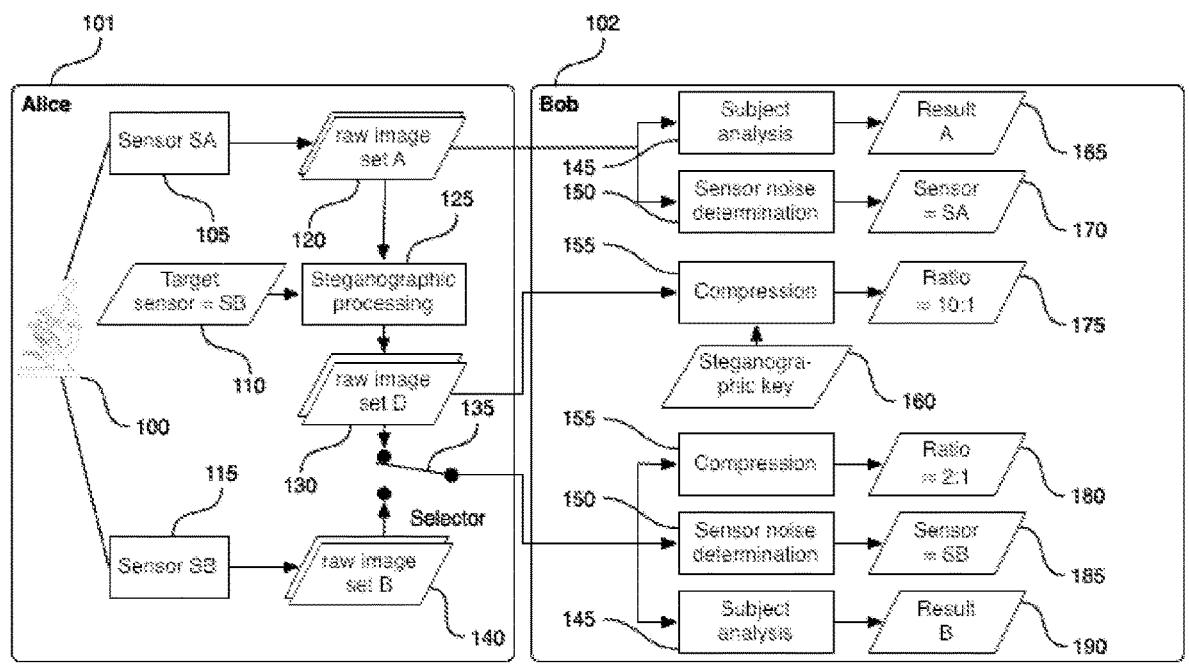
FIG. 1 schematically illustrates the steganographic model underlying the present invention.

FIG. 1 illustrates the underlying steganographic model: A user 101, arbitrarily referred to as Alice, of the method according to the invention is tasked to acquire images of a given subject 100. She can do so by choosing either image sensor SA 105, hereinafter also designated as source sensor SA, or image sensor SB 115, hereinafter also designated as target sensor SB, producing raw image sets A 120 or B 140, respectively. Another user 102, arbitrarily referred to as Bob, will process the images in various ways. He may, among other things, perform some analysis 145 of the subject, try to determine which sensor acquired the images by studying the noise 150, or apply lossless compression 155. If Alice hands him the image set A 120, Bob will find result A 165 when analysing 145 the subject, and the sensor noise determination 150 will yield sensor SA as output 170. When Bob is handed image set B 140, he will, correspondingly, receive result B 190 from the subject analysis 145, and sensor SB as output 185 of the the sensor noise determination 150. When Bob applies lossless compression to image set B 140, he will obtain a compression ratio 180 of about 2:1. Note that image sets A and B are assumed to show the same subject 100 under identical conditions. Nevertheless, it is possible that results A 165 and B 190 are different on a statistically significant level because the respective noise in the two image sets affects the outcome of the subject analysis 145.

However, Alice can choose to apply steganographic processing 125 to image set A 120, optionally including compression and decompression, to obtain a processed image set D 130. In doing so, she can specify that the processed image set D 130 imitates the noise model of sensor SB as target sensor 110. Alice can then freely select 135 which of the two image sets B 140 or D 130 she transmits to Bob. Without a corresponding steganographic key 160 Bob will be unable to distinguish between the image sets B and D and, in particular, he will be unable to detect, if not being previously informed about this, that one of the image sets B and D, respectively which of the image sets B or D, has passed through steganographic processing/compression, whatever processing he applies. More precisely, he will within statistical fluctuations obtain the results 180, 185, 190 corresponding to image set B 140 when performing lossless compression 155, sensor noise determination 150 and subject analysis 145 on either of the two image sets. This gives strong guarantees on the quality and indistinguishability of the (processed) compressed data with respect to (unprocessed) raw data. Only in the situation where Bob is in possession of the correct steganographic key 160 previously used for the steganographic processing of image set A to produce image set D 120 will he be able to distinguish image set D 130 from image set B 140. He can, for example, use the key 160 to perform efficient compression with a ratio 175 of about 10:1 when applying lossless compression 155, whereas without knowing key 160 he will still obtain only a low compression ratio 180 of about 2:1.

It is to be noted here that the source sensor SA 105 that produced the image set A 120 is not necessarily identical to the target sensor SB 115 used as a model to take image set B 140. This is because, in practical applications, giving output data that has been corrected for various defects of the physical sensor, for example pixel inhomogeneity, fixed pattern noise, etc., is favorable, so that sensor SB 140 may be an "ideal" sensor. The important fact is that image set D 130 is consistent with coming from a (real or ideal) sensor with well-defined and specified properties. This allows to ensure that any post-processing that will occur on image set D 130 will give reliable results, as if the image set D 130 arose from target sensor SB 115.

Using an ideal model for target sensor SB has the further advantage that a number of real sensors SA-1, SA-2, . . . , SA-N, each with different properties, may be mapped to a unique ideal sensor SB. This is particularly important for machine learning approaches, where, for example, a neural network trained on images arising from a sensor SA-1 will not necessarily give reliable inference results when used with images from another sensor SA-2. In many practical situations, it is necessary to use historical data acquired with a sensor SA-1 to train a neural network, and eventually replace the sensor SA-1 with a newer model SA-2, as the sensor SA-1 may be discontinued, may have become less competitive or because the end-user would rather not be "locked-in" to one single manufacturer. Having data from different sensors SA-1 . . . SA-N mapped so that it is consistent with coming from an ideal sensor SB therefore helps in these situations.

In one embodiment of this invention the target sensor SB is characterised by a set of properties comprising its quantum efficiency, readout noise, black level and gain. In another embodiment, target sensor SB is supposed to form an ideal device that outputs the exact number of photons absorbed by each pixel. It is also to be noted here that, as is the case with all physical systems and their inherent imperfections, mapping data from source sensor SA to the ideal model target sensor SB may be done in an approximate way due to practical limitations on the statistics gathered, and to finite imperfections or instabilities in the physical source sensor SA. This does not detract from the invention and, in practice, these imperfections are acceptable to the user and may be precisely specified and bounded.

In general, data from a target sensor SB 115 would not be adapted for lossless compression 155 by a ratio 180 of typically more than about 2:1. This means that, without the steganographic key 160, Bob will not be able to losslessly compress by a higher ratio. On the other hand, with key 160 in hand, Bob may perform lossless compression 155 of the data by a much higher ratio 175, typically up to about 10:1. This allows the invention to provide the user simultaneously with data that he can use exactly as he would use raw data, but on which he can apply lossless compression with a factor of typically up to 10:1.

The invention described here has a number of other advantages which derive from its tight integration with steganography. In particular, the processed and possibly compressed and thereafter decompressed image set D, which is typically 10 times larger than the corresponding data having been compressed by a method according to the present invention, is advantageously used for embedding useful information, while guaranteeing that the image set D may still be used in any processing application where the raw image set B may be used, and give statistically indistinguishable results from that. In a preferred embodiment, this allows to embed other pieces of information, together with the pseudo-noise parameters, in the final processed image, like for example:

image metadata such as the time it was taken, the system that was used to take it, the camera system it was taken from,
 data aiding compression, e.g. the properties of the device that has taken the image, the image size and binary layout (e.g. strips, blocks, etc.),
 data enhancing the security, integrity and validation of the image, such as a hash of the raw image data or similar that can prove the authenticity of the image data, ownership or copyright information, a digital signature from the device that originally has taken the data, watermarking data that may be recovered even after processing, and error-correction data that may be used to recover part of the image and metadata should it be lost or damaged.

Furthermore, for users to be able to fully benefit from this novel compression technology, it is important that they be able to use this technology without significant alterations to their workflow, or of their existing systems, which implies for example to continue using container files of their choice, such as known file formats like tiff, dng, png, dicom, jp2, etc.

Figure 2A:
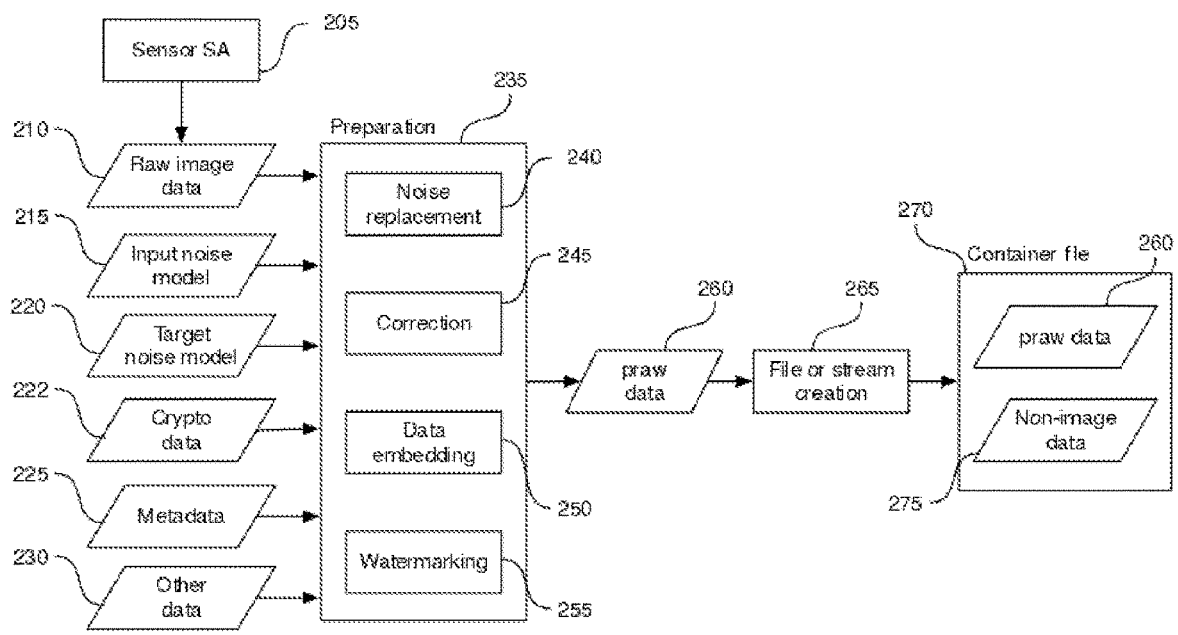
FIGS. 2A, 2B and 2C schematically illustrate the principal steps of a method according to the present invention.
Figure 2B:
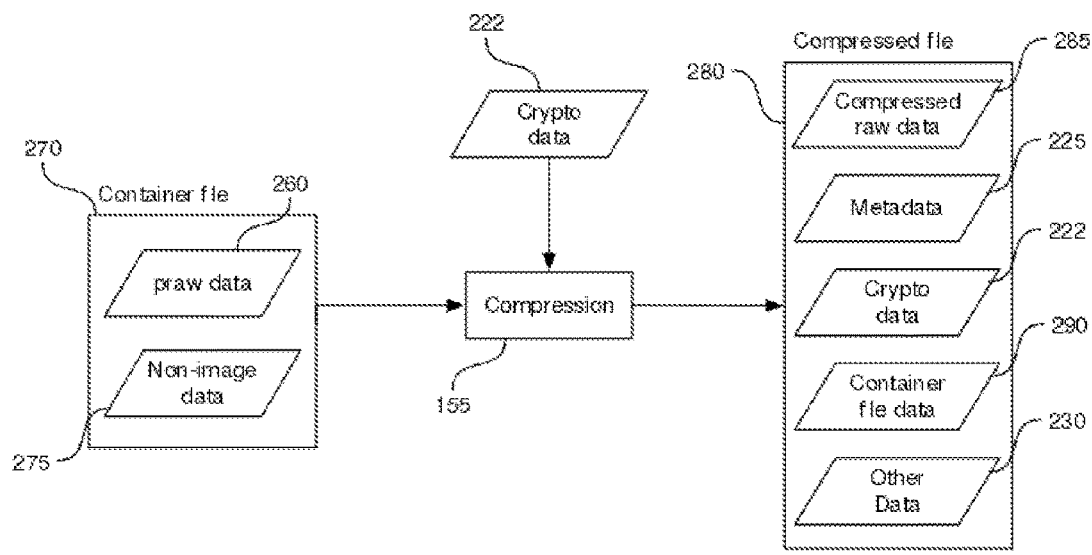
Figure 2C:
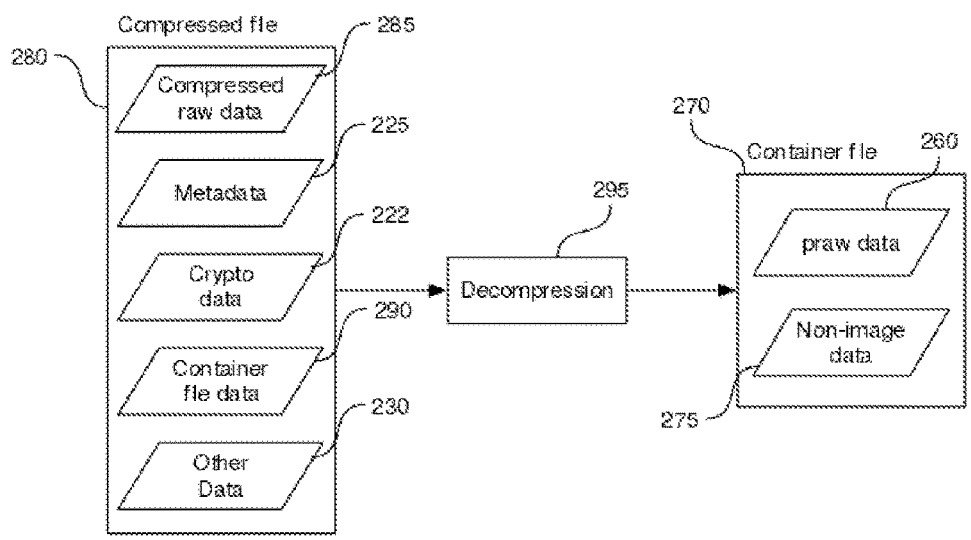

FIGS. 2A to 2C schematically show the principal steps of a preferred embodiment of a method according to the present invention allowing for the features mentioned above. In a preparation step 235, illustrated in FIG. 2A, raw image data 210 captured by source sensor SA 205 is prepared such that unpredictable noise arising in source sensor SA 205 during acquisition of the image, said noise despite its unpredictable nature following a given input noise model 215, is replaced 240 by pseudo-random predictable noise complying to a target noise model 220 from a real or ideal target sensor SB, possibly but not necessarily different from source sensor SA 205. Cryptographic data 222 may be used in the generation of the pseudo-random noise and other sub-steps of the preparation step 235. Optionally, this preparation step 235 also comprises sub-steps for correcting 245 the data for sensor imperfections, embedding 250 metadata 225 or embedding other data 230 as mentioned above, and/or performing watermarking 255 such that the data that has been prepared in such way can easily be identified at a later stage, even if only part of it is available. This preparation operation yields "prepared raw" data, also denoted as "praw" data 260 in the following description as well as in the figures. Said praw data 260 is suitable to be used in any application that uses raw data, such as mentioned above. This praw data 260 may be used standalone because, contrary to standard raw data, it contains the necessary metadata that makes it more practically useful. Alternatively and optionally, the praw data 260 may be embedded in a container file 270 of any known file format such as tiff, jp2, dng, png, etc., as is typically done with raw data. A container file with praw data is compatible with any application that is already able to work with this file type, but has the advantage of being highly compressible. In the container file 270, one can usually also store non-image data 275, which can comprise any pieces of metadata 225 or other data 230. This may be used to store a copy of data that were already directly embedded into the praw data 260.

In the preferred embodiment, the compression step following said preparation step and illustrated in FIG. 2B uses steganographic/cryptographic data 222 to predict the pseudo-noise and efficiently and losslessly compress 155 the praw data 260. Said steganographic/cryptographic data 222 may be encoded in the compressor itself, in the praw file, and/or given by the user. The steganographic/cryptogaphic data 222 can also be a pre-agreed constant or transferred in any other way. The compression step is also able to extract the metadata 225 and other data 230 if such data was embedded during the preparation step, and optionally makes use of this data to validate the quality, authenticity and integrity of the file, and/or apply error-correction, if required. The compression step then creates a compressed file 280 which contains data allowing for the original container file 270 including said praw data 260 to be restored in a lossless way.

Finally, in a decompression step following said compression step and illustrated in FIG. 2c, said compressed file 280 is decompressed 295 such as to yield again said praw data 260, respectively the container file 270 containing said praw data 260 and optionally some other non-image data 275 like mentioned above for the preparation step.

The container file 270 and the compressed file 280 may have complex structures containing many frames or images. The structure of these files, and the location of the binary praw data 260, is potentially unknown in advance to the compressor used in the compression step. In this case, a watermark embedded 255 in the praw data 260 allows the compressor to identify and locate this data, to extract any embedded data and to use the data to efficiently perform the compression. The compressor and decompressor may be implemented and operated explicitly by the user, or may operate in the background so files are transparently compressed and de-compressed, for example when transitioning through the network, when stored on disk, when transferred over a bus. The validation, integrity checks, authenticity, error correction and/or data/metadata extraction features may be operated independently from the compression and/or decompression.

To describe the method according to the present invention in more detail, it is to be noted, moreover, that digital images captured by image sensors generally contain a significant amount of entropy, which to a large account is due to sensor noise and also to the intrinsic noise of the light hitting the sensor. The presence of this noise is an important aspect of what gives the image its natural statistical properties. As mentioned above, removing this noise can result in processing algorithms yielding different results with respect to an image still containing said noise. The presence of noise, however, strongly limits the data size reduction that can be achieved using lossless compression. The present invention allows to process digital images in such a way that high lossless compression ratios can be achieved while maintaining a realistic noise profile which neither visually nor statistically, for example via the histogram of pixel values of the image, reveals that the image was processed. The fact that the image is highly compressible is hidden in a non-detectable steganographic way in an image processed by a method according to the present invention and can only be revealed with the help of a steganographic/cryptographic key or function.

A method according to the invention therefore generally includes the following steps for the preparation of a given digital image and a corresponding noise model of a digital camera or image sensor with specific settings. (1) Remove, in a suitable mathematical sense, most of the noise from the image captured by the source image sensor, e.g. by quantization or denoising. This may include corrections of sensor-specific noise, such as fixed pattern noise or photo-response non-uniformity. The result of this step is denoted as noise-reduced image data. (2) Generate pseudo-noise by suitable application of a pseudo-random number generator with well-defined initial conditions, e.g. an integer seed, and add the generated pseudo-noise to the noise-reduced image data in such a way that the resulting pseudo-noisy image closely imitates the desired target noise model. Said desired target noise model may be suitable to imitate the source sensor that acquired the original image data, or it may be adapted to a different real or ideal target sensor. In case of ideal functioning of the method according to this invention, it is impossible to tell that (most of) the noise of the final processed image was produced using pseudo-random numbers. (3) The pseudo-noisy image data, optionally comprising the noise model with corresponding parameters (including seed), and, if present and desired, the metadata and other data are stored to disk and/or transmitted over a bus or network. In preferred embodiments and depending on the requirements of the situation, this may happen in different ways which partly may be combined with each other: a) The different pieces of data are stored/transmitted as separate files, separate parts of a container file or separate data packages; b) metadata and other data are embedded in the pseudo-noisy image as described in further detail below while the pseudo-noise parameters are stored/transmitted separately; c) the pseudo-noise parameters are embedded in a subset of the pixels of the pseudo-noisy image using some steganographic method and option b) is used to embed metadata and/or other data. Furthermore, storage and/or transmission of the pseudo-noisy image data may optionally comprise one or more of the following steps:

Any or all of the data that are stored/transmitted together with the pseudo-noisy image may be encrypted, whether or not it is embedded in said pseudo-noisy image;

any or all of the data that is stored/transmitted together with the pseudo-noisy image may be encoded to facilitate error correction, whether or not it is embedded in said pseudo-noisy image;

any or all of the data that are stored/transmitted together with the pseudo-noisy image as well as the pseudo-noisy image itself may be complemented with a watermark or digital signature to facilitate authentication or identification of the data;

said noise model and corresponding parameters (including seed) may be constant and fixed, as is for example the case when hardcoded into hardware or software that is adapted to implement the methods of the present invention, or when made public on a website, in a specification, or similar.

The most simple embodiment of a method according to the present invention replaces most of the unpredictable noise in the image with predictable pseudo-noise. This comprises, after acquiring image data captured by the source image sensor, the steps of determining a source and target noise model, generating pseudo-noise, removing most of the noise from said image data, and adding the pseudo noise to the noise-reduced image data such as to produce pseudo-noisy image data which is statistically equivalent as compared to image data acquired with said target image sensor, and storing and/or transmitting said pseudo-noisy image data. Because the pseudo-noisy image data is statistically equivalent to image data acquired with said target image sensor, we term the above process steganographic, to highlight the fact that the image prepared in this manner is not readily distinguishable from a natural image arising from a sensor to which the target noise model applies. In this most simple embodiment, replacing in steganographic manner the natural noise with generated pseudo-noise may happen without use of a steganographic key, and neither the parameters of said target noise model nor any metadata of the image or other data need to be stored and/or transmitted, for example by storing and/or transmitting together with, in particular by embedding into, said pseudo-noisy image data. In fact, in this case, the target noise model and its parameters may be chosen to be constant and thus be made available/accessible by other means, such as mentioned above. As will become clear in the following, more sophisticated and elaborated embodiments of a method according to the present invention are preferred and allow to add, in different manner and at one's choice depending on the application of the method, the parameters of said target noise model and/or metadata of the image and/or other data to said pseudo-noisy image data, in particular by embedding this additional information into said pseudo-noisy image data, optionally by use of steganographic key(s). In any of these cases, it is thus guaranteed that the target noise model and the corresponding parameters, used for generating the pseudo-noise which is added to the noise-reduced image data for producing the pseudo-noisy image data, are available, i.e. are rendered accessible in some way, during the compression/decompression steps, respectively during any other desired step supposed to be applied on the pseudo-noisy image data, of a method according to the present invention, in order to allow for reproduction and/or subtraction of the pseudo-noise based on said pseudo-noisy image data and the parameters of the target noise model.

In this context, the steganographic key(s) can be secret or public, depending on the application, and the steganographic key(s), respectively in general adding the generated pseudo-noise in steganographic manner to the noise-reduced image data when producing the pseudo-noisy image data, serve the following purposes:

The fact that the file has been processed, i.e. the original image data has been replaced with pseudo-noisy image data following a given target noise model, is practically undetectable, except by making use of said steganographic key(s).

The fact that, as a result of the processing, the pseudo-noisy image can be efficiently and losslessly compressed is practically undetectable, too. More precisely, lossless compression will be as inefficient as on unprocessed image data, and efficient compression can only be "unlocked" and made available by using said steganographic key(s).

The fact that the pseudo-noisy image data besides the actual image data may contain additional data is practically undetectable, too. The additional data can only be accessed with the help of said steganographic key(s).

At a later stage, the pseudo-noisy image may be efficiently compressed without loss by using the pseudo-noise parameters to generate an identical copy of the pseudo-noise, which is then subtracted from the image, such that the exact same noise-reduced image of above step (1) is retrieved. Depending on which possibility for above step (2) is used, one may have to extract the pseudo-noise parameters from the image itself using a steganographic key, or read said parameters from a separate file or data package, or have it available otherwise in case the noise model and corresponding parameters (including seed) are constant and fixed. Additionally, metadata and other data can be extracted from the image if previously embedded therein. Next, said noise-reduced image can be efficiently compressed (typically a factor 5 to 10) using existing, as for example defined in the JPEG2000 standard, or custom lossless image codecs, owing to the previous noise reduction. The parameters of the pseudo-noise must be kept and can, for example, be stored together with the compressed image data.

The corresponding decompression may be performed by first decompressing the image data using the same lossless codec, and then re-applying the above steps (2) and (3) with the same parameters of the pseudo-noise. In case of ideal functioning of the method according to the present invention, the result will be bitwise identical to the final processed image obtained after above step (3).

In view of the principles set out above, it is in general possible to realize different embodiments of a method according to the present invention by implementing these steps at different stages of the image pipeline and/or by splitting these steps between different pieces of hardware and software. For example, an implementation can be integrated directly into the image sensor, which then performs steps (1) to (3) before the image data is transferred to the storage area or output bus of the sensor, while the subsequent lossless compression and decompression functionality is provided by a software module for a computer, tablet, mobile phone or similar.

Therefore, a method according to the present invention allows to retrieve, owing to said preparation step, a noise-reduced version of an image, suitably for efficient lossless compression, from a noisy version of the same image. Preferably, this is achieved by replacing the natural noise, whose origin typically is a combination of the quantum noise of the light captured by the image sensor and the electronic noise of the image sensor itself, with artificial pseudo-noise generated with the help of a pseudo-random number generator. While the natural noise is unpredictable, the pseudo-noise is deterministic and can be identically reproduced if the exact parameters and algorithm for the generation of the noise are known. However, an essential part of the present invention is that the pseudo-noise resembles natural noise of a given desired real or ideal target image sensor as closely as possible by imitating its characteristics through the use of a noise model, as will be described below in more detail. Correspondingly, the present invention further provides methods for lossless compression and decompression of images with pseudo-noise, said compression and decompression steps differing as compared to corresponding steps in prior art, as will be described below in more detail, too.

Further details about some of the sub-steps of the image preparation 235, compression 155, and decompression 295 will be given below.

Image Preparation

The first step is said image preparation step 235, during which the original raw image data 210 is processed in such a way that it is replaced with the pseudo-noisy version of the same image. The pseudo-noise parameters are preferably stored/transmitted together with the pseudo-noisy image, or embedded directly into the image using a steganographic, that is, ideally undetectable, method. Without the corresponding steganographic key, it should be impossible to tell that the image contains pseudo-noise rather than natural noise, and the image can be used for the same purposes and applications as the original image data 210. As already mentioned above and schematically illustrated in FIG. 2a, metadata 225 and other relevant data 230 optionally can also be embedded into the pseudo-noisy image, resulting in praw data 260 that is self-contained and can represent additional value compared to the original image data. For example, it is possible to embed other parameters important for optimal processing of the image data, or to embed data that proves the authenticity of the image.

FIG. 2A schematically illustrates the image preparation step 235. The description in this and the following sections will concentrate on so-called raw image data, that is, mostly unprocessed image data coming directly from a CMOS or CCD image sensor or an equivalent device. Those skilled in the art will understand that the invention can be equivalently applied to other kinds of image data by adapting some of the steps involved, in particular by using appropriate noise models.

Figure 3:
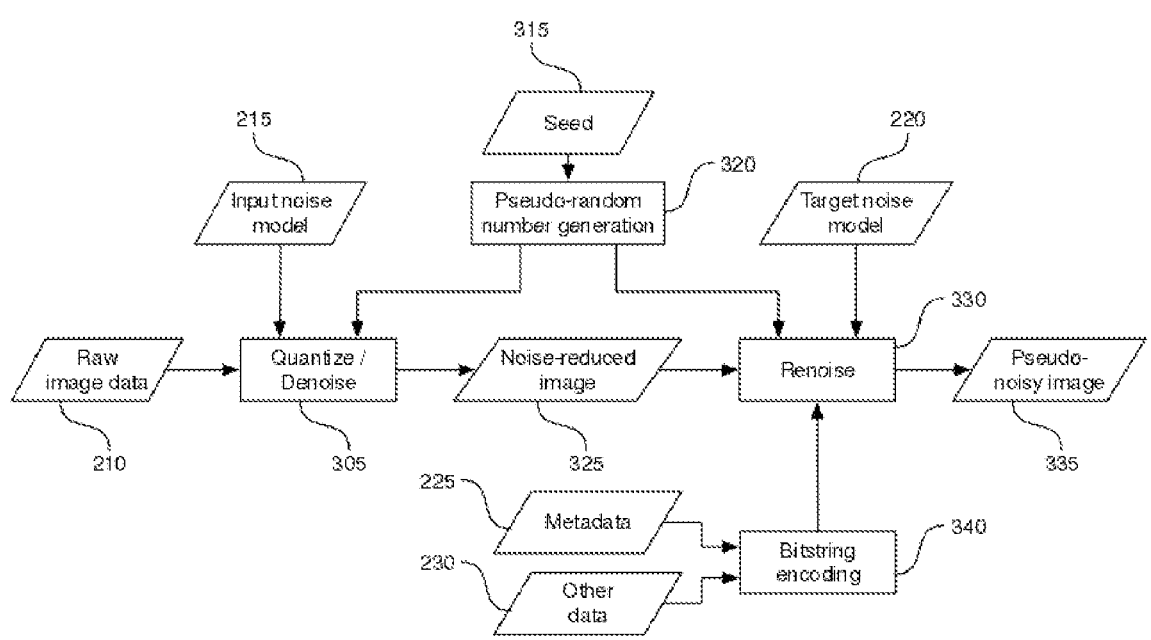
FIG. 3 schematically illustrates the noise-replacement step of the preparation step of a method according to the present invention.

The first step within the image preparation step 235 is to take said raw image data 210 and perform noise replacement 240 where most of the random noise in the image characterised by an input noise model 215 is replaced with pseudo-noise characterised by a target noise model 220. The noise replacement procedure is illustrated in FIG. 3. It starts out by applying a denoising or quantization step 305 with the help of an appropriate input noise model 215 and associated parameters in order to generate a noise-reduced image 325. A further ingredient may be a pseudo-random number generator 320, use of which will become clear in the following sections. The noise in raw image data captured by CCD or CMOS sensors is often well-described by a Poisson-Gaussian model, for which the estimated standard deviation $\sigma_i$ of the pixel i with value $x_i$ is given by $$\sigma_i = \sqrt{a(x_i - x_0) + b},$$

where the noise parameters for this model are a, which is related to the signal amplification inside the image sensor, the black level of the sensor $x_0$, and b, which is a parameter related to the read-out noise of the sensor. While this noise model is preferably used for CCD and CMOS raw image data, the following description will use a simplified model by assuming that the noise has a standard deviation $\sigma_0$ which is independent of the pixel value. This is a perfectly valid assumption for certain types of image sensors. In this case the number of noise bits per pixel for image data with integer values can be calculated as $$N_{bits} = \log_2(\sigma_0 \sqrt{12}) = \log_2(\sigma_0) + 1.792.$$

This number can, depending on the acquisition settings, be as large as 6 to 8 bits. For image data encoded into 16 bits, this severely limits the compression ratio that can be achieved with lossless compression. This situation can be improved by applying one of many denoising techniques known in prior art. Often, these techniques themselves are computationally intensive and require extreme care during some of the later steps of the image preparation 235 and decompression 295. Therefore, instead of applying such known denoising techniques, the image preparation step 235 of a method according to the present invention preferably comprises a step of quantizing by scaling the pixel values with a user-specified fraction q of the noise standard deviation $\sigma_0$ to obtain new pixel values. Many of the known drawbacks of quantization can be avoided by use of a subtractive dither. To that end, the above mentioned pseudo-random number generator 320 with seed S 315, where S is typically an integer, may be used to generate for every pixel i a pseudo-random number $R_i$ from a uniform distribution on the interval from 0 to 1 and to generate a noise-reduced image 325 by replacing the original value $x_i$ of each pixel i with a noise-reduced pixel value $$y_i = \text{round}\left(\frac{x_i}{\sigma_0/q} + R_i\right).$$

The quantized image composed of noise-reduced pixel values $y_i$ has fewer different values than the original image data composed of original pixel values $x_i$, so subsequent lossless compression of the quantized image is more efficient. If necessary, the noise-reduced pixel values $y_i$ can be scaled back to the original range by multiplication with $\sigma_0/q$. Like mentioned, a similar result may be achieved by applying known denoising techniques, but only at the price of computational cost and elevated care during some of the later steps of the method.

During the generation of the noise-reduced image 325 either by quantization or by denoising techniques 305, most of the natural noise is removed and a little bit of artificial, deterministic noise may have been added through the introduction of $R_i$.

In the second step within the image preparation step 235, the image is renoised 330 according to a target noise model 220. For example, the original noise level can essentially be restored through the transformation $$z_i = \text{round}\left([y_i - R_i] \cdot \frac{\sigma_0}{q}\right).$$

To calculate the restored pixel values $z_i$, the above mentioned input noise model 215 and its parameters are used, where the former specifies the function form of the transformation to use, and the latter the exact values of the parameters $\sigma_0$ and q. It is to be noted that instead of using the original input noise model, one can imitate a different target noise model 220 by using the corresponding function and parameters for the calculation of the restored pixel values $z_i$. If used as mentioned above, the pseudo-random number generator 320 is reused to create pseudo-noise of essentially the form $-R_i \cdot \sigma_0/q$, which is then added to the image data to form the pseudo-noisy image 335, composed of the restored pixel values $z_i$. It is essential that the value $R_i$ is the same for the calculation of both the noise-reduced pixel values $y_i$ and the restored pixel values $z_i$.

The third step within the image preparation step 235 of a method according to this invention is to store, respectively package for transmission, the pseudo-noisy image data as well as optionally the pseudo-noise parameters and other data, including metadata. If performed correctly, the step allows to a) use the pseudo-noisy image data whenever unprocessed image data of the corresponding type and format could have been used. In addition, a steganographic key allows b) to retrieve, at a later stage, the noise-reduced image data 325 from the pseudo-noisy image 335, such that it can be efficiently stored and transmitted with the help of lossless compression if so desired, and c) to retrieve metadata 225 and/or other data 230 which can be used to enable, facilitate, or improve image processing or analysis.

In some embodiments of a method according to the present invention, the pseudo-noisy image, noise parameters and other data are stored together in a suitable data structure, directory or other container, for example as provided by the Tagged Image File Format (TIFF/EP, ISO 12234-2). The seed value 315 for the pseudo-random number generator 320 may then act as steganographic key, because it can be combined with the noise-parameters to retrieve the noise-reduced image 325, as described below. Depending on the specific requirements of a given application of such embodiments, said seed can be secret or publicly available.

However, it is preferred to make the pseudo-noisy image 335 as self-contained as possible, that is, embed as much data as possible in the pseudo-noisy image data itself. In one embodiment of a method according to the present invention schematically illustrated in FIG. 3, the image metadata 225 and other data 230 is embedded during the renoising step 330 by first encoding the data as a suitable bitstring 340, which may include encryption and/or means for error correction. The embodiment then preferably makes use of two distinct seed values 315 $S_1$ and $S_2$, where $S_2$ may be derived from $S_1$. The bitstring 340 can be embedded in a sequence of pixels, one bit of the string per pixel, by using $S_1$ to generate random numbers whenever the bit is 0, and $S_2$ otherwise. Occasionally, $S_1$ and $S_2$ may result in the same pseudo-noisy pixel value $z_i$, giving rise to a so-called collision. Collisions can be handled by suitable error correction methods known in the prior art when the bitstring is extracted from the pseudo-noisy image 335 at a later stage. Provided that the pseudo-noise is undetectable when a single seed value 315 for the pseudo-random number generator 320 is used, the use of two distinct seed values should be equally impossible to detect, and hence the data is securely hidden in the pseudo-noisy image 335.

In another embodiment of a method according to the present invention, the data embedding is extended to include the pseudo-noise parameters themselves. For example, a cipher version $C_P$ of the parameters $P=\{\sigma_0,q,S,T\}$ is generated by means of an encryption step using a steganographic key K. Here, S represents one or more seed values for the random number generator 320, and T is the concatenation of certain pixels at fixed, pre-defined positions in the pseudo-noisy image 335. T is optional and may serve as a cryptographic salt that guarantees that $C_P$ will change from image to image even though $\sigma_0$, q, and S are the same. Note that P does not necessarily contain information about the type of noise model used in these steps, but can easily be extended to do so. The next step is the actual embedding procedure. In a simple embodiment, the cipher of the parameters $C_P$ is converted into a bit string of length k and the least significant bits of the first k pixels that were not used in the generation of T are overwritten with the corresponding value in the string. Hence, the values of these pixels are changed from $z_i$ to $z'_i$. This way of embedding $C_P$ is of limited security, and more sophisticated embodiments may use other methods of data embedding. Once $C_P$ has been embedded, the metadata 225 and other data 230 may be embedded in the remainder of the image using two different seed values, as described above.

More sophistic embodiments may also add redundancy and means for error correction for all data embedding, such that the embedded data may be retrieved when the image data has been subjected to cropping or other modifications. Independent of the specific method of data embedding, care must be taken that the restored pixel values $z'_i$ fulfill the relation $y_i(z'_i)=y_i(x_i)$, that is, that the processed image with pseudo-noise parameters, which is the result of the embedding step within the image preparation step 235 of a method according to this invention, can be used equally well to obtain the noise-reduced image data 325 as the original image data 210, provided that all other parameters are known and unmodified.

Compression

The second step of a method according to the present invention, which in all generality is optional and can be carried out at a later stage, is a compression step 155. It essentially consists of retrieving the noise-reduced image 325 from the pseudo-noisy image 335 with the help of the pseudo-noise parameters and seed values 315 for the pseudo-random number generator 320. The noise-reduced image 325 is then compressed using a lossless compression algorithm. Preferably, the pseudo-noise parameters, and possibly additional data, are combined with the compressed image data 285 to form the compressed image with pseudo-noise parameters, for example by storing everything in a single container file 280 or directory, to facilitate a later decompression step 295. Optionally, the compressed image with pseudo-noise parameters can be created such that it can be opened or viewed directly by imaging applications, either by using a container file, respectively format, which allows direct data access to the noise-reduced image data, or by adding some kind of preview image to the container.

Figure 4:
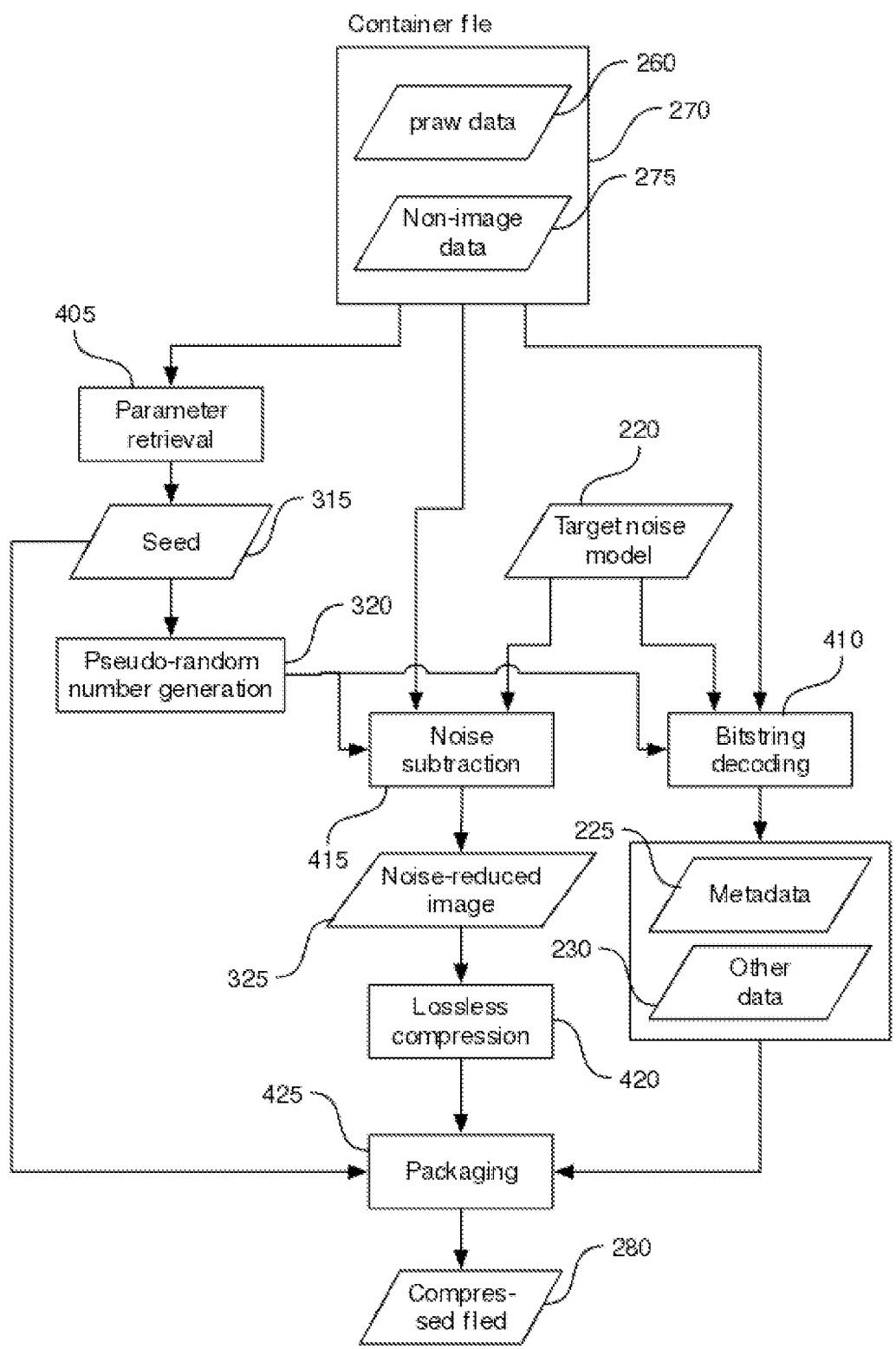
FIG. 4 schematically illustrates the compression step of a method according to the present invention.

The optional compression step of image data produced by the image preparation procedure 235 set out above will now be described in detail by referring to FIG. 4. To simplify, the description will use the same simple noise model as in the previous section, namely that of constant, signal-independent noise represented by standard deviation $\sigma_0$. However, this description analoguously applies to any other target noise model 220. The compression step takes as starting point the container file 270 or equivalent data structure that was previously produced by the image preparation step 235. The first step is the retrieval 405 of the pseudo-noise parameters and seed values 315. For embodiments where these parameters were embedded in the pseudo-noisy image, extraction proceeds as follows. First, a bit string of length k is generated by concatenating the least significant bits of the first k pixels that do not contribute to the generation of T. This bit string is equal to the cipher of the parameters $C_P$. $C_P$ is then decrypted with the key K, which as mentioned above may be represented by said seed values 315, to retrieve the parameters $P=\{\sigma_0,q,S,T\}$, which provides the required information for the target noise model 220, and the pseudo-random number generator 320. In a second step, these parameters can then be used to retrieve metadata 225 and other data 230 by bitstring decoding 410, and to re-generate the pseudo-noise according to the target noise model 220 which is essentially given by $-R_i \cdot \sigma_0/q$. The noise is then subtracted 415 from the pseudo-noisy image 335 in the praw data 260 of the container file 270 to retrieve the noise-reduced image 325. For the simple noise model used here, these steps are combined by calculating $$y_i = \text{round}\left(\frac{z'_i}{\sigma_0/q} + R_i\right).$$

It may be noted here that this is the same formula as used to calculate the noise-reduced image 325 during the image preparation step 235, except that here the processed image data represented by restored pixel values $z'_i$ is used, instead of the original raw image data 210, represented by original pixel values $x_i$. In a third step, lossless compression 420 is applied to the noise-reduced image data 325. The compression algorithm can be chosen amongst a variety of existing or custom algorithms for image data, such as lossless JPEG or PNG, or general-purpose compression, such as ZIP, according to requirements of the context in which the method according to the present invention is employed. Finally, the pseudo-noise parameters, metadata 225 and other data 230 are optionally encrypted and packaged 425 with the compressed image data into a compressed file 280 or equivalent data structure. Depending on the application, this concatenation can be performed by simply appending binary data to the same file, by using several files in an archive-like container, or by using the facilities of a special file format such as TIFF.

Decompression

In view of the above description of example embodiments for the preparation 235 and compression 155 steps, the corresponding decompression step of a method according to the present invention may be described in brief and is only schematically illustrated in FIG. 2C. Starting with the compressed file 280 or equivalent data structure, the first step of such decompression step is separation of the parameters P. The separation optionally includes decryption, if the parameters were stored in the encrypted form of the cipher of the parameters $C_P$. Lossless decompression is then used to recover the noise-reduced image data 325, corresponding to the exact same pixel values $y_i$ as those obtained during the image preparation step 235. Correspondingly, the decompression proceeds by reproducing the same steps as performed during the preparation step, namely adding the pseudo-noise to the noise-reduced image data 325 in a renoising step 330 and storing or embedding the pseudo-noise parameters, metadata and/or other data, that is, generating praw data 260 and putting everything into a container file 270. The output of the decompression procedure is a bit-identical copy of praw data 260 and/or the container file 270 that was produced by the image preparation step 235.

In view of the above description of several embodiments of a method according to the present invention, it is clear to a person skilled in the art that the invention has several important advantages. First, the invention allows to process digital image data in such a way that high lossless compression ratios of typically up to about 10:1 can be achieved while simultaneously maintaining a realistic noise profile which neither visually nor statistically reveals that the image was processed. Second, the present invention ensures that image data that has been compressed and decompressed from original "raw" image data cannot be distinguished, without knowledge of the steganographic manner or key used for processing the image data, from actual raw image data of a real or ideal sensor whose noise model was used. Third, the present invention advantageously allows to also embed several types of useful information into the processed image data, while still guaranteeing that the processed image data may be used in any application where the raw image data may be used, and give statistically indistinguishable results from that. Finally, the present invention allows users to fully benefit from corresponding methods by allowing them to use this technology without significant alterations to their workflow, or of their existing systems, for example by allowing them to continue using container files of their choice, such as files in known file formats like tiff, dng, png, dicom, jp2 or the like.

The invention claimed is:

1. A method for steganographic processing and compression of image data with negligible information loss, wherein said image data comprises noise and information, the method comprising the steps of:
    acquiring image data to be processed and/or compressed for storage and/or transmission;
    preparing the acquired image data for compression, said preparation step comprising the steps of:
        determining an input noise model and corresponding parameters adapted to reflect noise created by a source image sensor used to capture said image data,
        removing, with negligible information loss, noise from the acquired image data by use of said input noise model, such as to produce noise-reduced image data; and
    storing and/or transmitting the image data;
    wherein the step of preparing the acquired image data comprises the steps of:
        determining a target noise model and corresponding parameters adapted to reflect noise created by a real or ideal target image sensor,
        generating pseudo-noise according to said target noise model, and
        adding the generated pseudo-noise in steganographic manner to said noise-reduced image data such as to produce pseudo-noisy image data which is statistically equivalent as compared to image data acquired with said target image sensor; and
    wherein the step of storing and/or transmitting comprises:
        storing and/or transmitting said pseudo-noisy image data,
such as to allow for reproduction and/or subtraction of the pseudo-noise based on said pseudo-noisy image data and the parameters of the target noise model.

2. The method according to claim 1, wherein the target noise model and its parameters are either constant as well as available and/or are stored and/or transmitted together with the pseudo-noisy image data.

3. The method according to claim 1, wherein the step of preparing the acquired image data comprises the steps of:
    providing a steganographic key,
    storing and/or transmitting, by use of said steganographic key, the parameters of said target noise model used for generating the pseudo-noise to produce said pseudo-noisy image data, preferably embedding these parameters into said pseudo-noisy image data, said steganographic key preferably consisting in at least a seed for a pseudo-random number generator.

4. The method according to claim 3, wherein the step of embedding the parameters of said target noise model used for generating the pseudo-noise into said pseudo-noisy image data comprises encrypting said parameters based on said steganographic key.

5. The method according to claim 1, wherein the preparation step further comprises the steps of:

correcting the acquired image data for sensor imperfections, embedding into said pseudo-noisy image data metadata of the image or other data including calibration data of the sensor, and/or data useful for compression, preferably properties of the sensor used to capture the acquired image data, the image size and/or binary layout, embedding into said pseudo-noisy image data other data enhancing the security, integrity and validity of the image data, preferably a hash of the acquired raw image data, ownership and/or copyright information, and/or watermarking data, and/or embedding into said pseudo-noisy image data error-correction data, the step of embedding of the metadata and/or other data preferably comprising the step of encoding said metadata and/or other data and switching between two or more seed values for a random number generator which is used when adding pseudo-noise to the noise-reduced image data.

6. The method according to claim 1, wherein said pseudo-noisy image data is stored and/or transmitted as-is or is embedded in a file or container file of any format such that said pseudo-noisy image data is compatible with any application adapted to work with the format of said file or container file.

7. The method according to claim 1, wherein said input noise model adapted to reflect noise created by said source image sensor and/or said target noise model (220) adapted to reflect noise created by said target image sensor is realized by a Poisson-Gaussian model with a standard deviation $\sigma_i$ for a value $x_i$ of pixel i given by $\sigma_i = \sqrt{a(x_i - x_0) + b}$, where the noise parameters are an internal signal amplification parameter a of the sensor, a black level parameter $x_0$ of the sensor and a read-out noise parameter b of the sensor or is realized by a simplified model with a standard deviation $\sigma_0$ which is independent of the pixel values of the sensor.

8. The method according to claim 1, wherein the method further comprises the step of compressing said pseudo-noisy image data produced by the preparation step, either as-is or embedded in a container file.

9. The method according to claim 8, wherein the step of compressing comprises the steps of:

acquiring the pseudo-noisy image data produced by the preparation step, extracting, as far as the parameters of said target noise model are stored with the noise-reduced image data and based on said steganographic key, the parameters of said noise model used for generating the pseudo-noise, generating pseudo-noise according to the extracted or otherwise acquired parameters of said target noise model, subtracting the generated pseudo-noise from the pseudo-noisy image data produced by the preparation step such as to produce noise-reduced image data, losslessly compressing said noise-reduced image data such as to produce compressed noise-reduced image data, optionally packaging the parameters of said target noise model as well as, if present, metadata other data together with the compressed noise-reduced image data, storing and/or transmitting the compressed noise-reduced image data which optionally comprises the parameters of said target noise model used for generating the pseudo-noise as well as metadata and other data.

10. A tangible computer-readable medium storing instructions that, when executed by a computer, cause it to implement the method according to claim 1.

11. A device including the computer-readable medium storing instructions according to claim 10, wherein the device is chosen from the group consisting of a microprocessor, a field-programmable gate array, an image sensor, a mobile phone equipped with a digital camera, a digital photo apparatus, a digital video camera, a scanning device, a tablet, a personal computer, a server, a microscope, and a satellite.

12. A method for decompression of image data without information loss, comprising the steps of:

acquiring compressed image data produced by compressing pseudo-noisy image data produced by a preparation step, either as-is or embedded in a container file, the preparation step comprising:

determining an input noise model and corresponding parameters adapted to reflect noise created by a source image sensor used to capture said image data, removing, with negligible information loss, noise from the acquired image data by use of said input noise model, such as to produce noise-reduced image data; and acquiring parameters of a target noise model used for generating the pseudo-noise by:

determining said target noise model and corresponding parameters adapted to reflect noise created by a real or ideal target image sensor, generating pseudo-noise according to said target noise model, and adding the generated pseudo-noise in steganographic manner to said noise-reduced image data such as to produce pseudo-noisy image data which is statistically equivalent as compared to image data acquired with said target image sensor; and decompressing the compressed image data produced by said compression step.

13. The method according to claim 12, further comprising the steps of:

separating, as far as the parameters of said target noise model are embedded in the noise-reduced image data, the compressed noise-reduced image data and the parameters of the target noise model used for generating the pseudo-noise, losslessly decompressing said compressed noise-reduced image data such as to produce decompressed noise-reduced image data, extracting, as far as the parameters of said target noise model are stored with the noise-reduced image data and based on said steganographic key, the parameters of said target noise model used for generating the pseudo-noise, generating pseudo-noise according to the extracted or otherwise acquired parameters of said noise model, adding the generated pseudo-noise to the decompressed noise-reduced image data such as to produce pseudo-noisy image data, optionally embedding the parameters of said noise model as well as, if present, metadata and/or other data into the pseudo-noisy image data, and storing and/or transmitting the pseudo-noisy image data which optionally comprises the parameters of the noise model used for generating the pseudo-noise as well as metadata and/or other data.

14. The method according to claim 12, wherein said steganographic key is encoded in said pseudo-noisy image data, in a compressor, respectively in a decompressor, used in the compressing and decompressing steps, is available at predefined information sources comprising internet sites and internal documentation or available publicly, and/or given by a user of the method.

15. The method according to claim 12, wherein generation of pseudo-noise according to the parameters of said noise model and/or embedding, respectively encryption, is done by use of a pseudo-random number generator.

16. The method according to claim 12, wherein the steps of the method for steganographic processing and compression of image data and/or of the method for decompression of image data are executed such as to be split between different pieces of hardware and/or software.

17. A tangible computer-readable medium storing instructions that, when executed by a computer, cause it to implement the method according to claim 12.

18. A device including the computer-readable medium storing instructions according to claim 17, wherein the device is chosen from the group consisting of a microprocessor, a field-programmable gate array, an image sensor, a mobile phone equipped with a digital camera, a digital photo apparatus, a digital video camera, a scanning device, a tablet, a personal computer, a server, a microscope, and a satellite.

* * * * *